Patented Dec. 17, 1940

2,224,952

UNITED STATES PATENT OFFICE 2,224,952

METHOD OF MAKING A SOLDERED JOINT

Donald C. Dilley, Cleveland, Ohio, assignor to The Lindsay Wire Weaving Company, Cleveland, Ohio, a corporation of Ohio No Drawing. Application March 21, 1939,
Serial No. 263,192

1 Claim. (Cl. 113—112)

This invention relates to the making of joints in wires which heretofore have been connected by means of solder. It has particular application in the manufacture of seams for paper making wires where the last weft wire is soldered to the ends of the warp wires and where the last weft wires are ground down and soldered together. Heretofore, solder used for this purpose has been obtained in the form of a rod, wire or ribbon which has been made by melting together all of the ingredients which go to make up the solder material. In the manufacture of paper making wires, however, the solder is not usually applied directly to the work from the ribbon form because it cannot easily be spread uniformly onto the work. As a result, the openings in the fabric are apt to be clogged thus interfering with the proper drainage when the belt is put into operation upon a paper making machine. In practice therefore the ribbon has been ground into a powder and the powder has been applied to the work but this is objectionable because the solder as furnished commercially contains impurities which the wire manufacturer is unable to control. Consequently the manufacturer is not able, in advance of using the solder, to determine how it will act upon the wires. Some for example, will tend to form globular shapes and thereby clog the openings and interfere with the drainage. Additionally, the heat required to apply the solder has been so high that great skill has been required to avoid burning of the fabric. Any defect therefore resulting either from the improper application of solder or from the excessive amount of heat has required the cutting out and reformation of the damaged section. An excessive amount of solder is additionally objectionable in that seam forming wires are prevented from fitting snugly between adjacent warp wires and lying close to the weft wires. If the seam forming wires extend beyond the upper or lower plane of the fabric they tend to mark the paper that is formed above it whereas if they extend below the underside of the fabric they tend to wear prematurely against the suction boxes on the paper making machine. The solder, therefore, has an important bearing in the making of a satisfactory joint in paper making wires.

An object of my invention is to overcome or to lessen the difficulty heretofore experienced in the making of solder connections and particularly in the manufacture of seams for paper making wires. I accomplish this object by mixing solder ingredients in powder form and applying the mixture directly to the wires that are to be connected together. I have found that solder so made will flow more readily thus requiring a smaller amount without clogging the openings and also requiring less heat to perform the melting operation. In this way, the fabric is not endangered and the drainage is not impaired.

The composition which I have found to be suited for the soldering of paper making wires is as follows:

| | Per cent |
|---|---|
| Copper | 15 |
| Silver | 55 |
| Cadmium | 30 |

The copper that is used in electrolytic copper in powder form of minus 325 mesh fineness; cadmium is in powder form of minus 200 mesh fineness and the silver is amorphus metal. The powders are mixed, preferably by a tumbling action in a glass container, after having been weighted to the proportions of the desired composition. The solder therefore is not actually produced until the welding torch flame strikes it and hence the alloying action takes place at the precise point where the soldered joint is to be made.

By controlling the ingredients that go to make up the solder, the wire manufacturer may not be subjected to the risks that are attendant upon lack of uniformity in commercial solder. Moreover solder that is formed in accordance with my method will flow more freely and hence, requires a smaller amount to make an effective connection. This reduction lessens the tendency of the solder to fill the openings and thereby to interfere with the drainage. As applied for example to a seam wherein the last weft wires are ground down and abutted together, I find that the wires can be ground to a greater degree and that as a result, the two sections when brought together and soldered approximate more closely the normal diameter of the wire; thus resulting in a seam that has a drainage which is substantially the same as that in the body of the fabric.

The reduction in the amount of solder that is applied to the fabric is advantageous in that in the case of a sewed and soldered seam, the seam closing wires and stitching wires lay between the warp wires and can be pressed down into the fabric more readily than when an excessive amount of solder is used. This avoids premature failure of the seam.

I claim:

A method of making a soldered connection for woven wire fabric used in paper making machines comprising mixing copper, silver and cadmium in powder form, in substantially the proportions of 15% copper; 55% silver and 30% cadmium, applying the mixture to the wires that are to be joined together and then heating the material to form the soldered connection.

DONALD C. DILLEY.